United States Patent [19]

Heilig et al.

[11] Patent Number: 5,700,031
[45] Date of Patent: Dec. 23, 1997

[54] SUBASSEMBLY COMPRISING A STEERING WHEEL, A STEERING SHAFT AND A GAS GENERATOR

[75] Inventors: Alexander Heilig, Wissgoldingen, Germany; Dante Bigi, Mutlangen, Italy

[73] Assignee: TRW Occupant Restraint Systems GmbH, Alfdorf, Germany

[21] Appl. No.: 729,946

[22] Filed: Oct. 15, 1996

[30] Foreign Application Priority Data

Oct. 20, 1995 [DE] Germany ............ 29516621 U

[51] Int. Cl.⁶ ............................................ B60R 21/16
[52] U.S. Cl. ............................ 280/731; 280/740
[58] Field of Search ............................ 280/731, 740, 280/728.1, 728.2, 730.1, 741, 736

[56] References Cited

U.S. PATENT DOCUMENTS

| | | | |
|---|---|---|---|
| 3,744,817 | 7/1973 | Outsset | 282/731 |
| 3,822,894 | 7/1974 | Muller et al. | 280/731 |
| 5,139,281 | 8/1992 | Dzioba | 280/775 |
| 5,342,089 | 8/1994 | Fink et al. | 280/731 |
| 5,482,315 | 1/1996 | Chandler, Jr. et al. | 280/741 |
| 5,553,888 | 9/1996 | Turuer et al. | 280/731 |

FOREIGN PATENT DOCUMENTS

| | | | |
|---|---|---|---|
| 0615889 | 9/1994 | European Pat. Off. | 280/731 |
| 2143165 | 3/1973 | Germany | 280/731 |
| 2435295 | 2/1995 | Germany | 280/731 |

*Primary Examiner*—Christopher P. Ellis
*Attorney, Agent, or Firm*—Tarolli, Sundheim, Covell, Tummino & Szabo

[57] ABSTRACT

A subassembly comprises a steering wheel, a steering shaft joined to same in such a manner as to prevent relative rotation therebetween and a gas generator to deploy a gas bag arranged inside the steering wheel. The steering shaft has a cavity which extends along its longitudinal axis and opens at the end of the steering shaft which is adjacent to the steering wheel. The steering wheel has a hub and an opening in same through which the cavity is in fluid communication with the interior of the cavity. The gas generator is arranged in the cavity and has an elongated housing. The gas generator is axially held in the cavity of the steering shaft. Since the gas generator is not accommodated within the steering wheel, the size and weight of the steering wheel are reduced.

6 Claims, 4 Drawing Sheets

5,700,031

SUBASSEMBLY COMPRISING A STEERING WHEEL, A STEERING SHAFT AND A GAS GENERATOR

BACKGROUND OF THE INVENTION

The present invention relates to a subassembly comprising a steering wheel, a steering shaft joined to same in such a manner as to prevent relative rotation and a gas generator to deploy a gas bag arranged inside the steering wheel.

In such a subassembly the gas generator, normally arranged within the interior of the steering wheel, is fired when it is required so that a gas bag, also within the interior of the steering wheel, is inflated and develops a protective action for the driver of a motor vehicle if there is a head-on crash.

SUMMARY OF THE INVENTION

One object of the invention is to reduce the weight of the steering wheel in a subassembly of the type initially mentioned and to economize in the space required for the accommodation of the gas generator in the same.

For this purpose there is the provision that the steering shaft has a cavity extending along its longitudinal axis and opening at least at the end adjacent to the steering wheel of the steering shaft; the steering wheel has a hub and an opening therein, via which the cavity is connected with the interior of the hub; the gas generator is inserted in the cavity and has an elongated housing; and the gas generator is secured axially in the cavity of the steering shaft. It is in this manner that the gas generator placed in the interior of the steering shaft may be secured in the course of assembly between a support surface on the steering shaft and an oppositely placed clamping face. Since the gas generator is now no longer a part of the steering wheel, the latter has a lower weight and a lower overall size.

Further features of the invention are defined in the dependent claims.

The invention will now be described with reference to the accompanying drawings in which various different embodiments of a subassembly in accordance with the invention are illustrated.

DETAILED DESCRIPTION OF INVENTION

Figure 1:
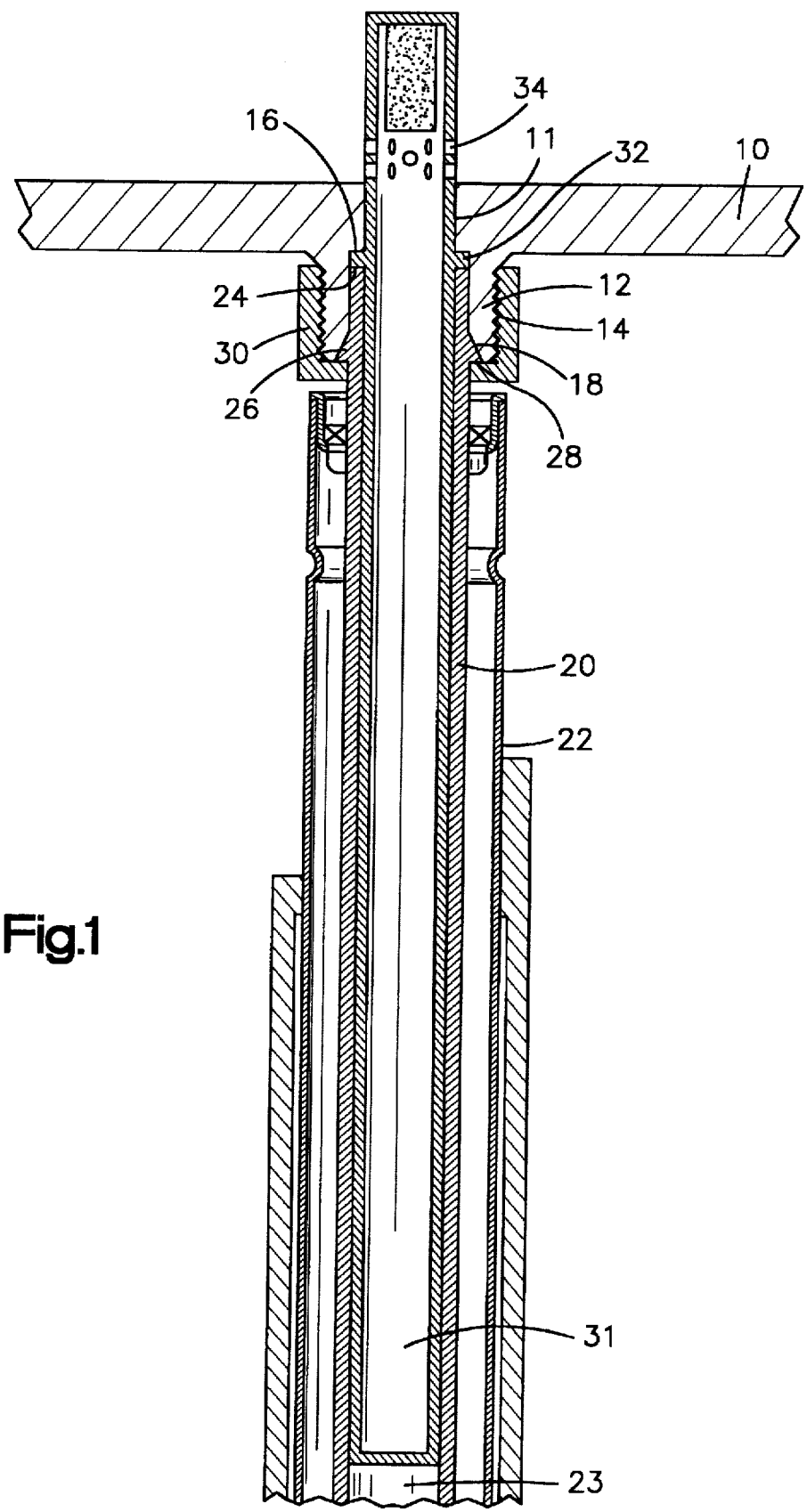
FIG. 1 diagrammatically shows a first embodiment of the invention in a longitudinal section.

In FIG. 1 the reader will diagrammatically perceive a first embodiment of the subassembly in accordance with the invention. The steering wheel (not illustrated) comprises a hub 10, illustrated only in part, which is furnished with an opening 11, which connects the interior space of the hub 10 with the outer space. Concentrically to this opening a skirt 12 is formed which bears an external screw thread 14. The internal diameter of the skirt 12 is larger this internal diameter of the opening 11 so that at the transition between the skirt 12 and the hub 10 an annular clamping surface 16 is formed on the inner side of the skirt. On its free end the skirt 12 possesses a conical receiving socket 18.

In such a manner as to prevent relative rotation the hub 10 is connected with a steering shaft 20 which is rotatably mounted in a casing tube 22. The steering shaft 20 is made hollow and possesses a cavity 23 extending along its longitudinal axis. The circularly annular terminal surface of the steering shaft 20 at its end adjacent to steering wheel constitutes a support surface 24. At a certain distance from the support surface 24 a conical head 26 is formed on the outer periphery of the steering shaft 20, such head 26 possessing a circularly annular support surface 28 engaged by the collar of a union nut 30, which is screwed onto the screw thread 14 and clamps the steering shaft against the hub 10 in such a manner as to prevent relative rotation.

In the cavity in the steering shaft 20 a generally cylindrical gas generator 31 is placed, which is furnished with a collar 32 extending radially past the outer periphery of the housing. This collar is clamped or braced between the clamping surface 16 and the support surface 24 so that the gas generator is secured in the axial direction of the steering shaft 20. The housing of the gas generator extends through the hole 11 into the interior of the hub 10 and in this part of the housing outlet openings 34 are provided, through which the gas from a gas generator charge (not illustrated), produced when necessary, may flow into the hub 10 of the steering wheel and deploy a gas bag arranged there.

Figure 2:
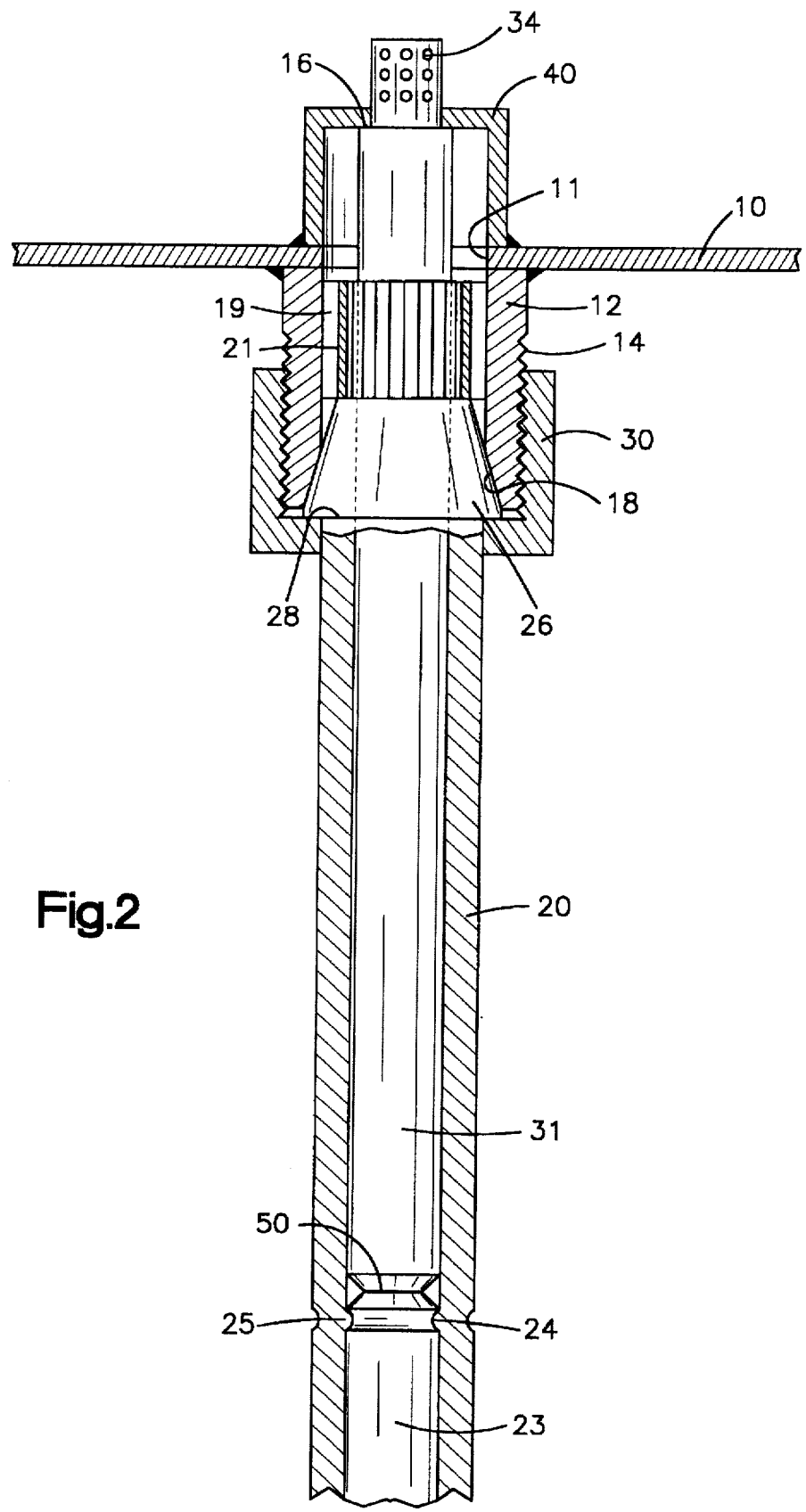
FIG. 2 diagrammatically illustrates a second embodiment of the invention in a longitudinal section.

FIG. 2 shows a further embodiment of the invention. As regards the components disclosed in the preceding embodiment, reference should be had to the explanations therein. In the case of this embodiment as well the hub 10 and the skirt 12 are provided. In addition to the conical socket the skirt 18 is provided with female splines 19 mating with splines 21 formed on the steering shaft 20. On the inner side of the hub a cup-like holding portion 40 is arranged, which is provided with an opening concentric to the hole 11 in the hub 10 and on whose inner side, encircling such hole, the clamping surface 16 is formed. In the case of this embodiment as well the steering shaft 20 is hollow and at a certain distance from its end adjacent to the steering wheel it possesses on its inner side a bead 25 extending radially inward, on which the support surface 24 is formed. In the case of this embodiment as well the gas generator 30 is braced in place between the clamping surface 16 and the support surface 24, two belleville washer elements 50 being arranged between the gas generator end, adjacent to the support surface 24, and the support surface 24 itself, such belleville washers compensating for inaccuracies in manufacture.

Figure 3:
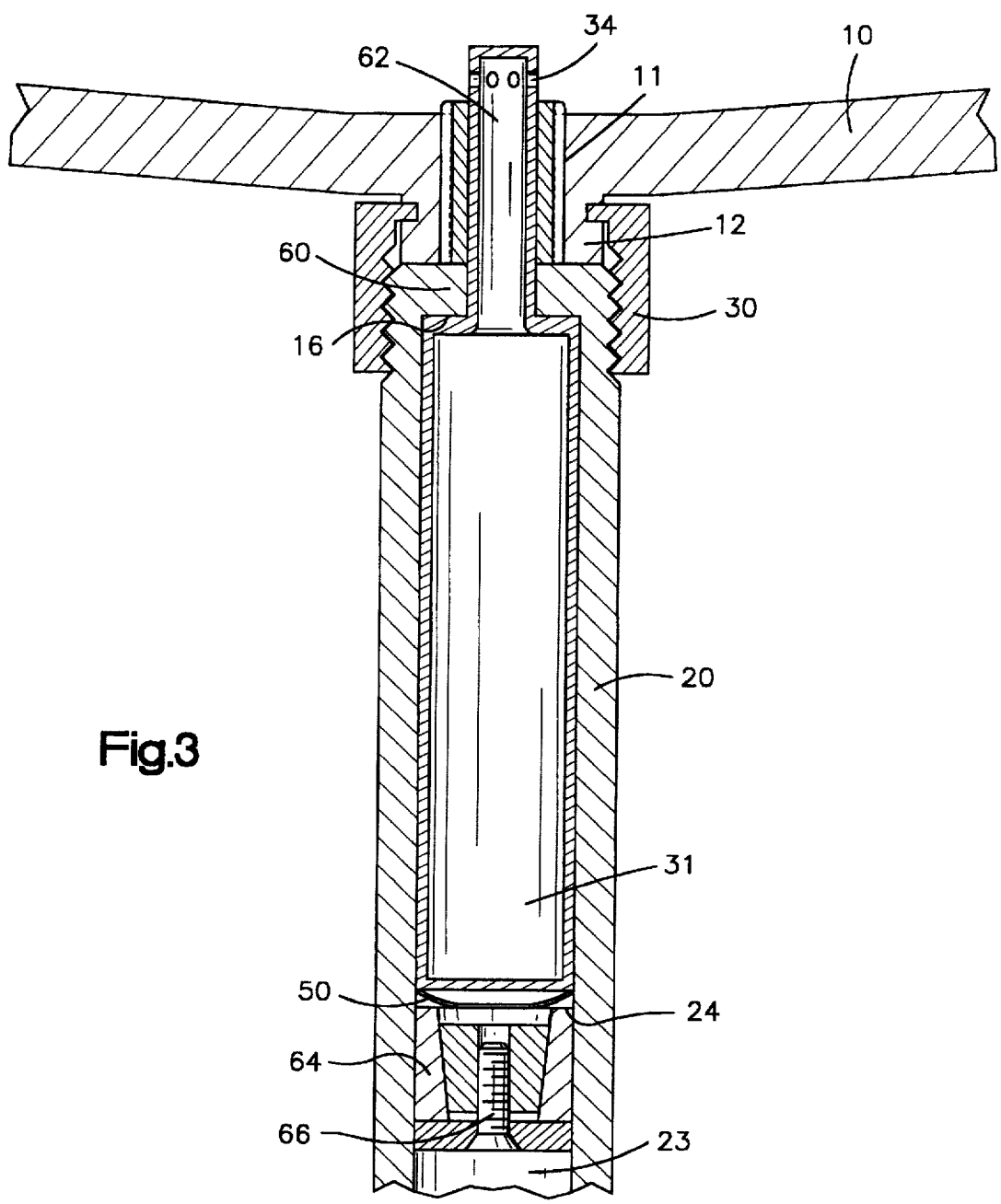
FIG. 3 diagrammatically shows a third embodiment of the invention in a longitudinal section.

FIG. 3 shows a further embodiment of the invention. As regards the components disclosed in the preceding embodiments, reference should be had to the explanations therein. Unlike the preceding embodiments at its end adjacent to the hub 10 the steering wheel possesses a shoulder 60 projecting into the cavity 23 with the result that an circularly annular ledge is formed, which constitutes the clamping surface 16. At its end adjacent to the steering wheel the gas generator 31 possesses a pin 62 of reduced diameter so that between the pin 62 and the housing of the gas generator 31 a shoulder is formed which is also circularly annular and which abuts the clamping surface 16. The support surface 24 is formed by a counter abutment element 64 inserted in the cavity 23 of the steering shaft 20, such element being braced axially by means of a screw 66. In this embodiment a belleville washer element 50 is placed between the support surface 24 and the gas generator.

Figure 4:
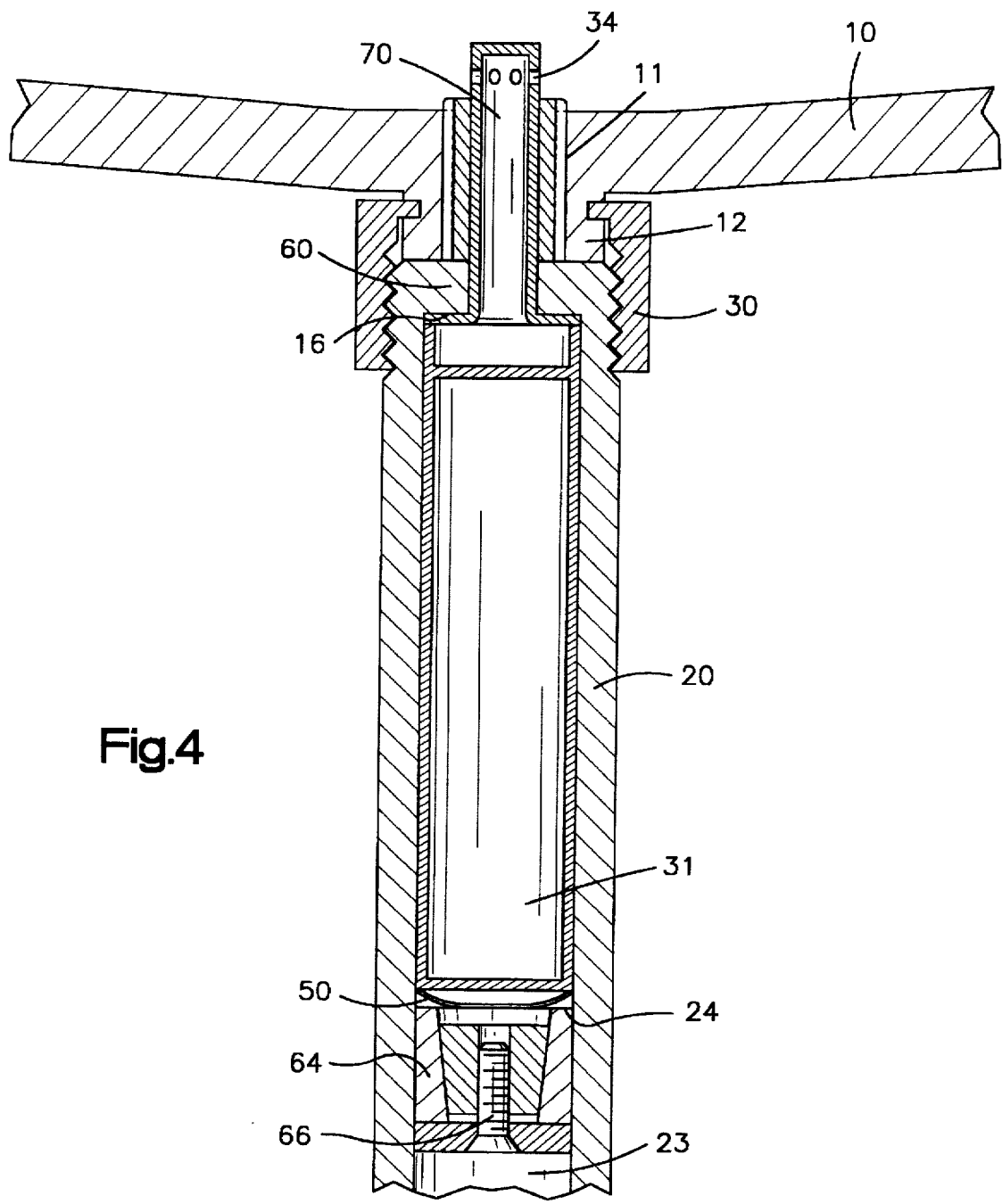
FIG. 4 diagrammatically depicts a modification of the embodiment of FIG. 3 in a longitudinal section.

In FIG. 4 a modification of the embodiment of FIG. 3 is depicted. In the case of this embodiment the gas generator ends in the steering shaft and (in terms of this figure) above the gas generator 31 there is a separate tube element 70 inserted into the steering shaft 20 to bear against the clamping surface 16 and to extend as far as a position in the interior of the hub 10. Owing to the arrangement of the outlet openings 34 on the end, arranged in the interior of the hub 10, of the tube element 70 it is possible for the direction of flow of gas produced by the gas generator 31 into a gas bag placed inside the hub 10 to be modified.

Owing to the design of the subassembly in accordance with the invention there are the following advantages: Since the gas generator is no longer arranged in the steering wheel, the latter is lighter in weight and has a overall size. Fixing the gas generator is more particularly simple to perform, since it only has to be slid into the interior of the steering shaft. Securing it in the axial direction of the steering shaft is performed on mounting the steering wheel on the steering shaft, when the gas generator is clamped between the support surface and the clamping surface. In all these embodiments a union nut is preferably employed for securing the steering wheel on the steering shaft, this offering still further advantages. On the one hand it facilitates the use of a hollow steering shaft and of a gas generator extending right into the interior of the hub and on the other hand such union nut is accessible from outside the hub so that the components to be arranged within the steering wheel hub of the gas bag restraining system may be installed in the steering wheel even before same is connected with the steering shaft.

We claim:

1. A subassembly comprising a steering wheel, a steering shaft connected to said steering wheel for joint rotation, a gas bag accommodated in said steering wheel and a gas generator for inflation of said gas bag;

said steering shaft having a cavity extending along a longitudinal axis of said steering shaft and opening at least at an end thereof which is adjacent to said steering wheel, said steering wheel having a hub and an opening therein through which said cavity is in fluid communication with said opening;

said gas generator being arranged within said cavity and having an elongated housing;

said gas generator being axially held in said cavity;

said steering shaft having an end face forming a support surface on said end thereof adjacent to the steering wheel, a clamping face being formed by a surface which surrounds said opening of said steering wheel on an outer side of said hub, and said gas generator housing being provided with a radially outwardly extending collar which is secured between said clamping face and said support surface.

2. A subassembly comprising a steering wheel, a steering shaft connected to said steering wheel for joint rotation, a gas bag accommodated in said steering wheel and a gas generator for inflation of said gas bag;

said steering shaft having a cavity extending along a longitudinal axis of said steering shaft and opening at least at an end thereof which is adjacent to said steering wheel, said steering wheel having a hub and an opening therein through which said cavity is in fluid communication with said opening;

said gas generator being arranged within said cavity and having an elongated housing;

said gas generator being axially held in said cavity;

a cup-like holding portion being provided inside of said hub, a clamping face being formed on said holding portion, a radially inwardly extending bead being formed inside of said steering shaft, and said gas generator housing being locked between said support face and said bead.

3. A subassembly comprising a steering wheel, a steering shaft connected to said steering wheel for joint rotation, a gas bag accommodated in said steering wheel and a gas generator for inflation of said gas bag;

said steering shaft having a cavity extending along a longitudinal axis of said steering shaft and opening at least at an end thereof which is adjacent to said steering wheel, said steering wheel having a hub and an opening therein through which said cavity is in fluid communication with said opening;

said gas generator being arranged within said cavity and having an elongated housing;

said gas generator being axially held in said cavity;

said steering shaft having an end provided with an inwardly directed flange, said flange defining a clamping face, a support surface being formed on a counter abutment element arranged within said steering shaft and clamped therein, and said gas generator housing being locked between said clamping face and said support surface.

4. The subassembly as claimed in claim 1, wherein said gas generator housing is extended through said opening of the hub into the interior of said hub.

5. The subassembly as claimed in claim 2, wherein a spring is arranged between said support face and said gas generator.

6. The subassembly as claimed in claim 3, wherein a tube element is clamped between said clamping face and an end of said gas generator adjacent to said steering wheel, said tube element extending through said opening of the hub into the interior of said hub.

* * * * *

UNITED STATES PATENT AND TRADEMARK OFFICE
CERTIFICATE OF CORRECTION

PATENT NO. : 5 700 031
DATED : December 23, 1997
INVENTOR(S) : Alexander Heilig and Dante Bigi It is certified that error appears in the above-indentified patent and that said Letters Patent is hereby corrected as shown below:

On the cover page, item [75], change "Italy" to --Germany--.

Signed and Sealed this

Fifteenth Day of September, 1998

Attest:

BRUCE LEHMAN

Attesting Officer    Commissioner of Patents and Trademarks